(12) United States Patent
Ebrahimi Afrouzi

(10) Patent No.: US 11,294,389 B1
(45) Date of Patent: *Apr. 5, 2022

(54) RECHARGE STATION FOR MOBILE ROBOT

(71) Applicant: Ali Ebrahimi Afrouzi, San Diego, CA (US)

(72) Inventor: Ali Ebrahimi Afrouzi, San Diego, CA (US)

(*) Notice: Subject to any disclaimer, the term of this patent is extended or adjusted under 35 U.S.C. 154(b) by 10 days.

This patent is subject to a terminal disclaimer.

(21) Appl. No.: 16/883,327

(22) Filed: May 26, 2020

Related U.S. Application Data

(63) Continuation of application No. 15/377,674, filed on Dec. 13, 2016, now Pat. No. 10,698,411.

(51) Int. Cl.
| | |
|---|---|
| *G05B 15/00* | (2006.01) |
| *G05B 19/00* | (2006.01) |
| *G05D 1/02* | (2020.01) |
| *B60L 53/14* | (2019.01) |
| *B25J 19/00* | (2006.01) |
| *B25J 9/00* | (2006.01) |

(52) U.S. Cl.
CPC .......... *G05D 1/0225* (2013.01); *B25J 19/005* (2013.01); *B60L 53/14* (2019.02); *G05D 1/0276* (2013.01); *B25J 9/0003* (2013.01); *Y10S 901/01* (2013.01)

(58) Field of Classification Search
CPC .... G05D 1/0225; G05D 1/0276; B60L 53/14; B25J 19/005; B25J 9/0003; Y10S 901/01
See application file for complete search history.

(56) References Cited

U.S. PATENT DOCUMENTS

| | | | |
|---|---|---|---|
| 4,777,416 A | 10/1988 | George | |
| 6,525,509 B1 | 2/2003 | Petersson | |
| 6,764,372 B1 | 7/2004 | Rae | |
| 7,068,004 B2 | 6/2006 | Tsurumi | |
| 7,332,890 B2 | 2/2008 | Cohen | |
| 7,501,780 B2 | 3/2009 | Yamamoto | |
| 8,390,251 B2 | 3/2013 | Cohen | |
| 9,215,957 B2 | 12/2015 | Cohen | |
| 2005/0156562 A1* | 7/2005 | Cohen | G05D 1/0225 320/107 |
| 2007/0050086 A1 | 3/2007 | Lim | |
| 2007/0244610 A1 | 10/2007 | Ozick | |
| 2010/0324736 A1 | 12/2010 | Too | |
| 2012/0323365 A1 | 12/2012 | Taylor | |
| 2016/0229060 A1 | 8/2016 | Kim | |
| 2017/0050311 A1* | 2/2017 | Yoo | A47L 9/2852 |
| 2017/0102709 A1* | 4/2017 | Kwak | A47L 9/2847 |
| 2017/0147001 A1 | 5/2017 | Shen | |

\* cited by examiner

*Primary Examiner* — Harry Y Oh

(57) ABSTRACT

A recharge station for a mobile robot and method for navigating to a recharge station. Two signal emitters on the recharge station emit uniquely identifiable signals in two separate ranges. A mobile robot is configured to look for the signals with two signal receivers, a left receiver looking for the signals of the left emitter and a right receiver looking for the signals of the right receiver. Upon sensing the left emitter signals with the left receiver and the right emitter signals with the right receiver, the mobile robot is aligned with the recharge station. The mobile robot is configured to then drive forward until charging contacts on the mobile robot make contact with charging contacts on the recharge station.

20 Claims, 5 Drawing Sheets

RECHARGE STATION FOR MOBILE ROBOT

CROSS-REFERENCE TO RELATED APPLICATIONS

This application is a Continuation of U.S. Non-Provisional patent application Ser. No. 15/377,674, filed Dec. 13, 2016, which is hereby incorporated by reference.

FIELD OF THE DISCLOSURE

The disclosure relates to a recharge station for a mobile robot, and more particularly, to methods for navigating a mobile robot to a recharge station.

BACKGROUND

Various types of mobile robots are used in home and commercial settings to carry out routine tasks like vacuuming, mopping, and polishing floors. These robots and other robotic devices are often powered by rechargeable batteries that must be periodically recharged. A mobile robot may be recharged manually by connecting the robot to a charging apparatus. However, it may be more desirable to have method for a mobile robot to autonomously recharge itself without when needed without any human intervention.

SUMMARY

Some aspects provide a recharging station of a mobile robot including: a housing; at least one charging contact for connecting with at least one charging contact of the mobile robot to charge a battery of the mobile robot; a power supply electrically coupled with the charging contacts to provide electrical power thereto; a first signal emitter emitting a first signal in a predetermined range; and a second signal emitter emitting a second signal in a predetermined range, separate from the predetermined range of the first signal, such that the signals from the first signal emitter and the signals from the second signal emitter do not overlap.

Some aspects include a method for recharging a mobile robot, including: emitting, with a first signal emitter of a recharging station, a first signal; emitting, with a second signal emitting of the recharging station, a second signal, wherein the signals from the first signal emitter and the signals from the second signal emitter do not overlap; and aligning, with a processor of the mobile robot, the mobile robot with the recharging station by seeking a state in which a first signal receiver of the mobile robot receives the first signal and a second signal receiver of the mobile robot receives the second signal simultaneously.

DETAILED DESCRIPTION SOME EMBODIMENTS

The disclosure provides a recharge station for recharging a battery of a mobile robot and method for navigating a mobile robot thereto.

Figure 1A:
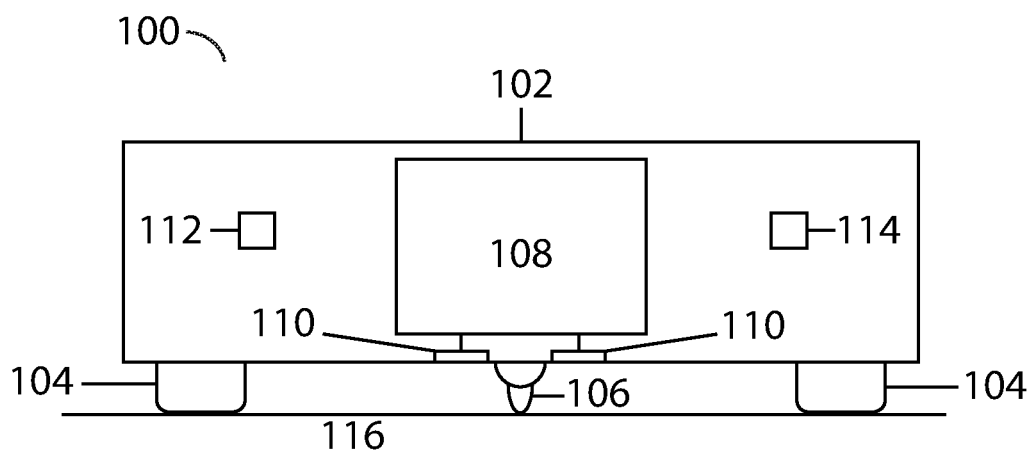
FIG. 1A illustrates a front elevation view of a mobile robot, according to some embodiments.

FIG. 1A illustrates an example of a mobile robot 100. A mobile robot 100 may be comprised of a casing or shell 102, left and right wheels 104, a front wheel 106, a rechargeable battery 108, charging contacts 110 that are electrically coupled to the battery, a processor (not illustrated), a right signal receiver 112 and a left signal receiver 114, the signal receivers being electrically coupled to the processor. Line 116 represents the work surface upon which the mobile robot 100 drives. Various types of mobile robots with different components or layouts may be used in conjunction with the recharge station, so long as the charging contacts and signal receivers are compatible (positioned appropriately to make contact or receive signals) with the below described recharge station. The example mobile robot is given for illustrative purposes only and is not intended to limit the scope of the invention.

Figure 1B:
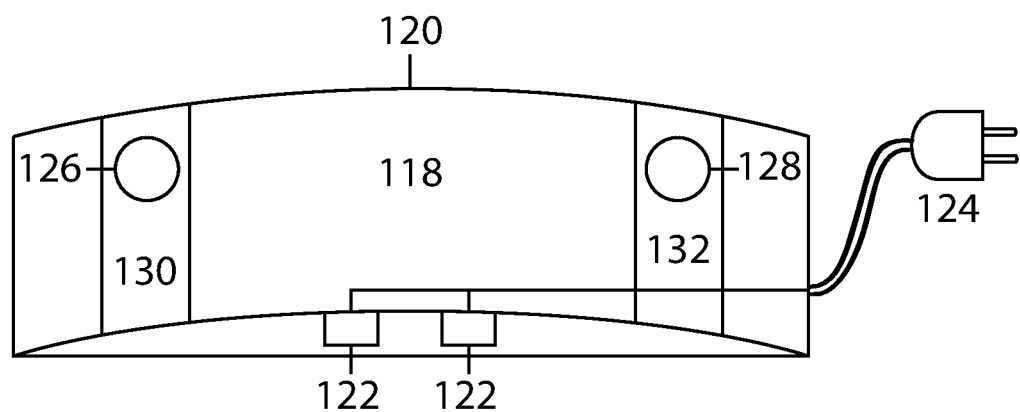
FIG. 1B illustrates a front elevation view of a recharge station, according to some embodiments.

FIG. 1B illustrates a recharge station 118. Recharge station 118 is comprised of housing 120, charging contacts 122 are arranged on the surface of the housing such that the charging contacts 110 (see, FIG. 1A) of the mobile robot 100 make contact with the charging contacts 122 when the mobile robot 100 drives up to and against the recharge station 118, power supply 124 electrically coupled to the charging contacts 110 and supplying power thereto, left signal emitter 126 situated within and at the back of channel 130, and right signal emitter 128 situated within and at the back of channel 132. The channels 130 and 132 serve to limit the signal range of the respective signal emitters 126 and 128.

Figure 2:
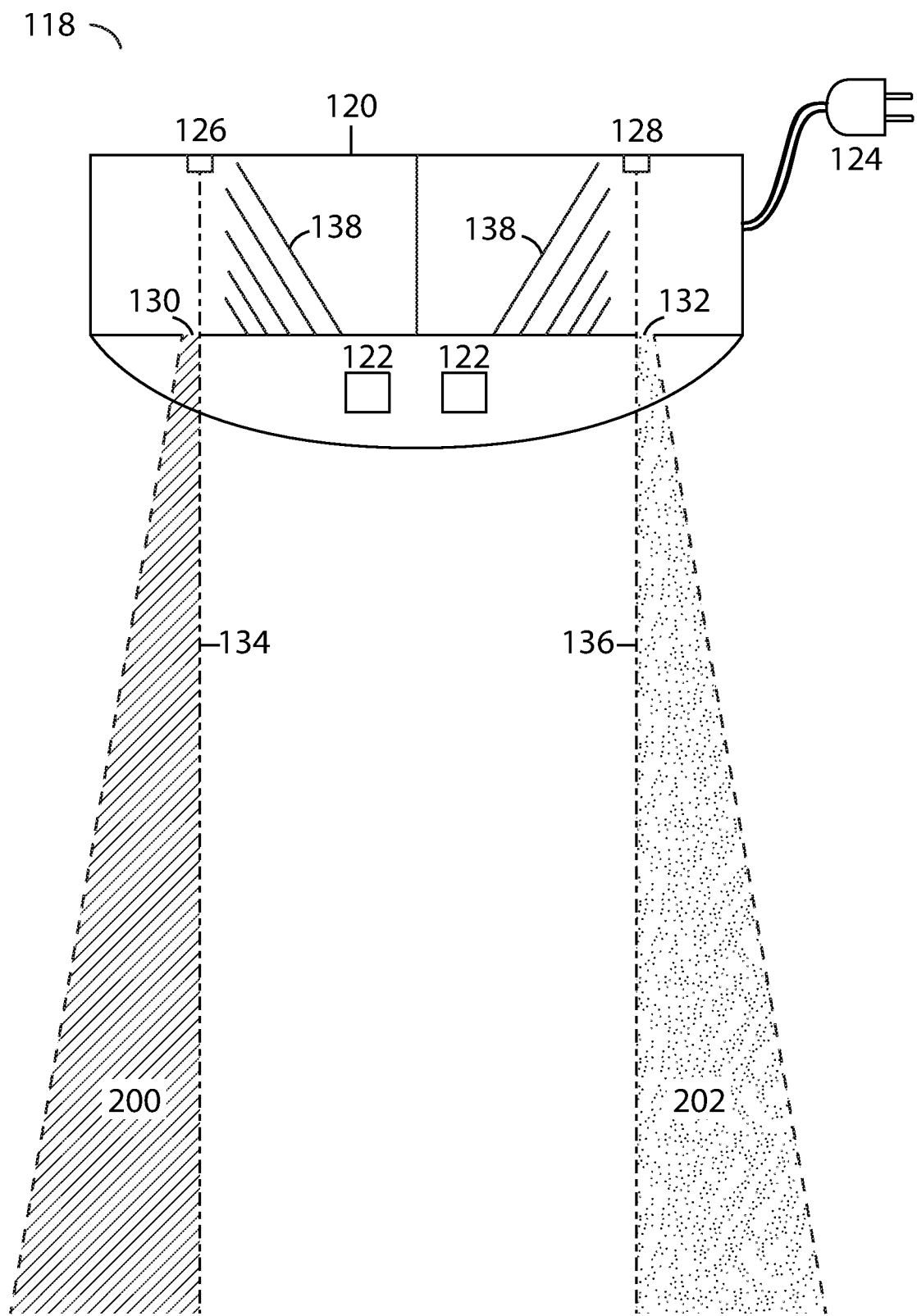
FIG. 2 illustrates an overhead view of a recharge station, according to some embodiments.

FIG. 2 illustrates an overhead view of recharge station 118. As before, recharge station 118 includes housing 120, charging contacts 122, power supply 124, left signal emitter 126, and right signal emitter 128. Channels 130 and 132 may limit the signal range of emitters 126 and 128, respectively. Left signal emitter 126 emits a first signal 134 in range 200 and right signal emitter 128 emits a second signal 136 in range 202. The first and second signals are unique from each other such that they may be differentiated by receivers. Signals may be differentiated by any of: a color of a signal, a carrier frequency of a signal, a modulation of a signal, a bit pattern of a signal, or a wavelength of a signal. Signals may be pulsed, emitted at intervals, or continuous. A number of baffles 138 may also be provided within the housing to further limit the range of the signals and prevent signal reflections from creating false signals. In some embodiments, baffles as well as the walls of the housing are made of a signal-absorbing material. It should be noted that range 200 and range 202 do not overlap. The signals 134 and 136 are each emitted within their own range that is not common with the range of the other signal emitter.

Figure 3:
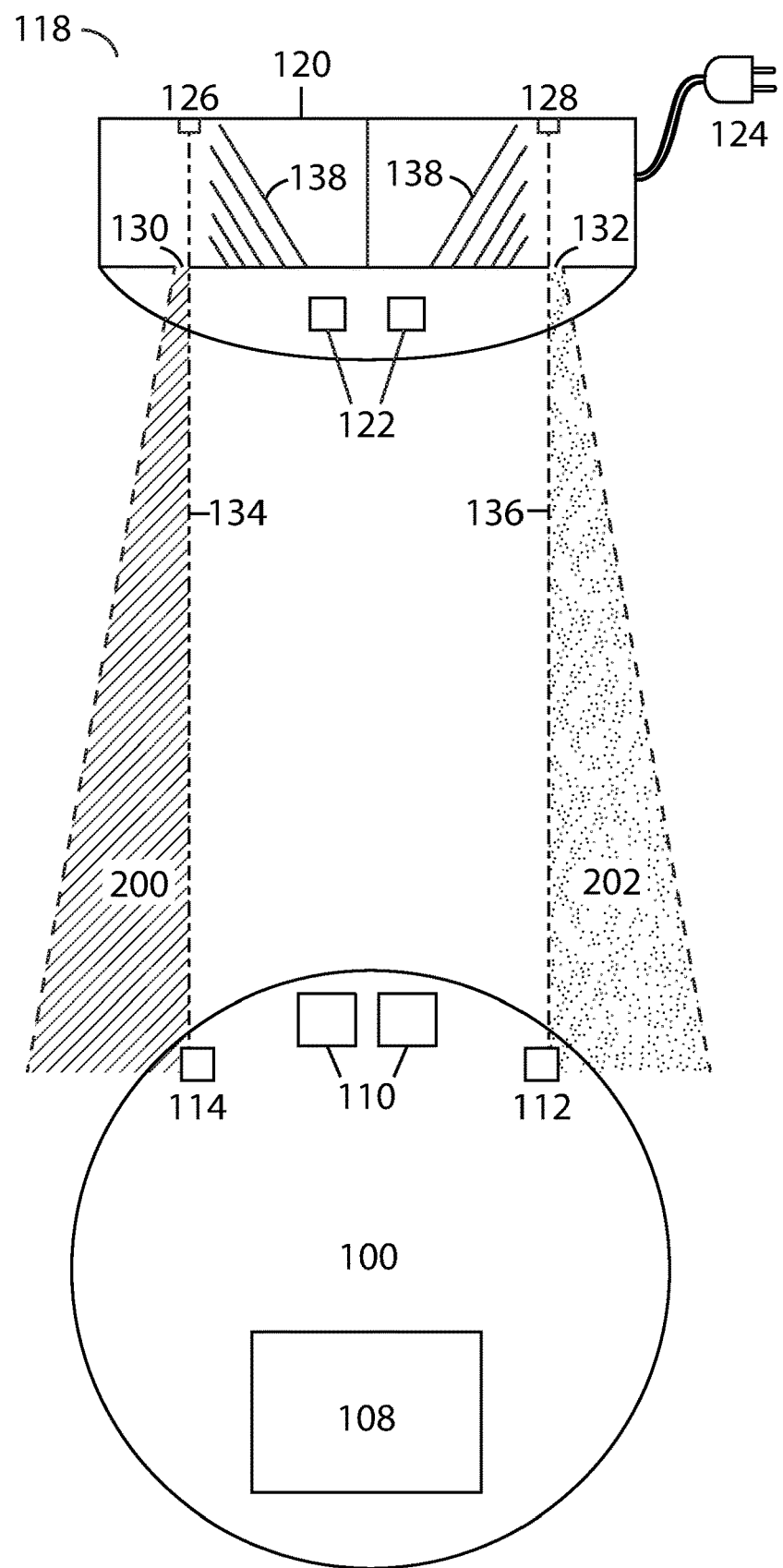
FIG. 3 illustrates an overhead view of a mobile robot navigating to a recharge station, according to some embodiments.

FIG. 3 illustrates an overhead view of recharge station 118 of mobile robot 100. Mobile robot 100 aligns itself with recharge station 118 using input from left and right signal receivers 114 and 112. When left signal receiver 114 detects signals 134 and right signal receiver 112 detects signals 136 the mobile robot 100 is substantially correctly aligned with the recharge station 118. From this point, the mobile robot 100 needs only to drive in a forward direction until its charging contacts 110 are positioned over the charging contacts 122 of the recharge station 118 to complete the battery circuit and charge the battery 108. A processor (not illustrated) within the mobile robot 100 may be programmed to seek a state in which both of these conditions are met when it enters a recharge station seeking mode. That is, the processor may be configured to seek a state in which the left signal receiver 114 detects signals 134 and the right signal receiver 112 detects signals 136. Seeking such a state may be carried out by driving the mobile robot in a random pattern or by following a set of navigation instructions or by using SLAM or other mapping technology to navigate to the general location of the recharge station and then using signal input as described herein to more precisely navigate to the recharge station.

The processor may be further configured to adjust movement of the mobile robot based on signals received by the receivers. For example, in some embodiments, when right signal receiver 112 receives signals 134 and left signal receiver 114 receives no signals, the processor may be configured to turn the mobile robot clockwise a predetermined number of degrees, or until, for example left receiver 114 detects signals 134, then drive forward a predetermined distance, then rotate in a counterclockwise direction until left receiver 114 detects signals 134 and right receiver 112 detects signals 136. In a like manner, in some embodiments, when left signal receiver 114 receives signals 136 and right signal receiver 112 receives no signals, the processor may be configured to turn the mobile robot counterclockwise a predetermined number of degrees, or until, for example, right receiver detects signals 136, then drive forward a predetermined distance, then rotate in a clockwise direction until right receiver 112 detects signals 136 and left receiver 114 detects signals 134.

Additional navigational instructions may be defined for various scenarios, such as when the same signal is received by both receivers, when the receivers receive the correct signals for a period but after driving a distance, one of the receivers no longer receives the corresponding correct modulated signal, etc.

Figure 4:
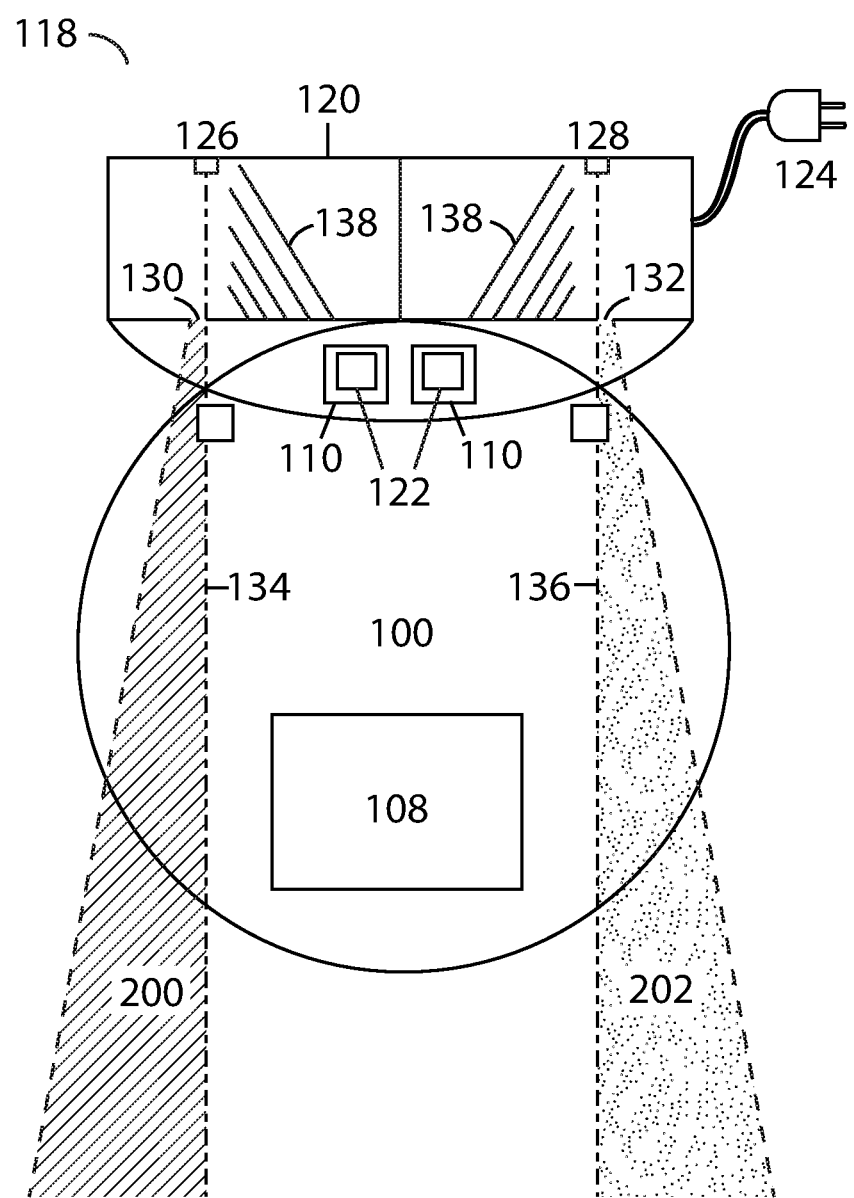
FIG. 4 illustrates an overhead view of a mobile robot recharging on a recharge station, according to some embodiments.

FIG. 4 illustrates an overhead view of mobile robot 100 recharging on recharge station 118 (some of the numbers have been omitted in this view so as not to unnecessarily obscure the invention). As can be seen, charging contacts 110 of mobile robot 100 are positioned over charging contacts 122 of recharge station 118, thereby completing the battery circuit to charge the battery 108.

Figure 5:
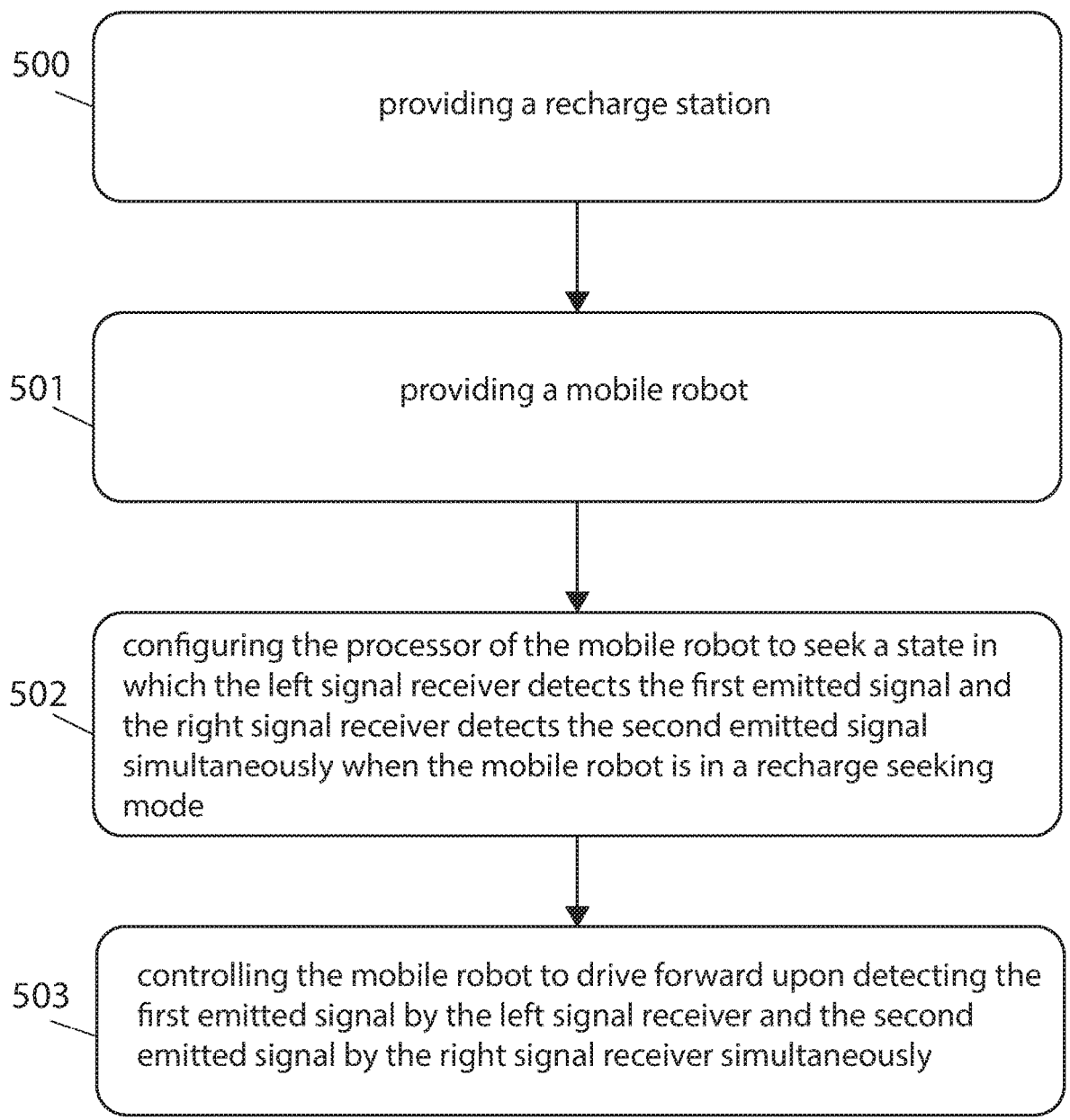
FIG. 5 illustrates a flowchart describing a method for recharging a mobile robot, according to some embodiments.

FIG. 5 illustrates a flowchart describing a method for recharging a mobile robot including steps 500, 501, 502, and 503, according to some embodiments.

The invention claimed is:

1. A recharging station of a mobile robot comprising:
a housing;
at least one charging contact for connecting with at least one charging contact of a mobile robot to charge a battery of the mobile robot;
a power supply electrically coupled with the charging contacts to provide electrical power thereto;
a first signal emitter emitting a first signal in a predetermined range; and
a second signal emitter emitting a second signal in a predetermined range, separate from the predetermined range of the first signal, such that the signals from the first signal emitter and the signals from the second signal emitter do not overlap, wherein:
the mobile robot aligns with the recharging station based on the signals received by a first signal receiver and a second signal receiver of the mobile robot; and
the mobile robot is aligned with the recharging station when the first signal receiver detects the first signal and the second signal receiver detects the second signal simultaneously.

2. The recharging station of claim 1, wherein the first signal and the second signal are differentiated from one another based on any of a color of a signal, a carrier frequency of a signal, a modulation of a signal, a bit pattern of a signal, and a wavelength of a signal.

3. The recharging station of claim 1, wherein the mobile robot drives in a forward direction when aligned with the recharging station until the at least one charging contact of the mobile robot connects with the at least one charging contact of the recharging station.

4. The recharging station of claim 1, wherein the driving speed of the mobile robot is reduced upon receiving the first signal by the first signal receiver and the second signal by the second signal receiver simultaneously.

5. The recharging station of claim 1, wherein receiving the second signal by the first signal receiver and no signal by the second signal receiver causes the mobile robot to turn in a clockwise direction a predetermined number of degrees or until the second signal receiver receives the second signal and then turn in a counterclockwise direction until the first signal receiver receives the first signal and the second signal receiver receives the second signal.

6. The recharging station of claim 1, wherein receiving the first signal by the second signal receiver and no signal by the first signal receiver causes the mobile robot to turn in a counterclockwise direction a predetermined number of degrees or until the first signal receiver receives the first signal and then turn in a clockwise direction until the second signal receiver receives the second signal and the first signal receiver receives the first signal.

7. The recharging station of claim 1, wherein the mobile robot uses SLAM to navigate to a general location of the recharge station then more precisely aligns with the recharging station based on the signals received by the first signal receiver and the second signal receiver.

8. The recharging station of claim 1, wherein the first signal emitter is positioned in a first channel and the second signal emitter is positioned in a second channel.

9. The recharging station of claim 8, wherein the first channel limits the range of the first signal emitter and the second channel limits the range of the second signal emitter such that the signals from the first signal emitter and the signals from the second signal emitter do not overlap.

10. The recharging station of claim 1, wherein at least one of the first signal and the second signal are emitted in pulses, continuously, or intervals.

11. The recharging station of claim 1, wherein the recharging station comprises baffles for limiting the range of the signals and preventing signal reflections from creating false signals.

12. The recharging station of claim 1, wherein at least a portion of the recharging station is fabricated from signal-absorbing material.

13. A method for recharging a mobile robot, comprising:
emitting, with a first signal emitter of a recharging station, a first signal;
emitting, with a second signal emitting of the recharging station, a second signal, wherein the signals from the first signal emitter and the signals from the second signal emitter do not overlap; and aligning, with a processor of a mobile robot, the mobile robot with the recharging station by seeking a state in which a first signal receiver of the mobile robot receives the first signal and a second signal receiver of the mobile robot receives the second signal simultaneously.

14. The method of claim 13, wherein the first signal and the second signal are differentiated from one another based on any of a color of a signal, a carrier frequency of a signal, a modulation of a signal, a bit pattern of a signal, and a wavelength of a signal.

15. The method of claim 13, wherein the mobile robot drives in a forward direction when aligned with the recharging station until at least one charging contact of the mobile robot connects with at least one charging contact of the recharging station.

16. The method of claim 13, wherein:
receiving the second signal by the first, signal receiver and no signal by the second signal receiver causes the mobile robot to turn in a clockwise direction a predetermined number of degrees or until the second signal receiver receives the second signal and then turn in a counterclockwise direction until the first signal receiver receives the first signal and the second signal receiver receives the second signal; and
receiving the first signal by the second signal receiver and no signal by the first signal receiver causes the mobile robot to turn in a counterclockwise direction a predetermined number of degrees or until the first signal receiver receives the first signal and then turn in a clockwise direction until the second signal receiver receives the second signal and the first signal receiver receives the first signal.

17. The method of claim 13, wherein the mobile robot uses SLAM to navigate to a general location of the recharge station then more precisely aligns with the recharging station based on the signals received by the first signal receiver and the second signal receiver.

18. The method of claim 13, wherein:
the first signal emitter is positioned in a first channel and the second signal emitter is positioned in a second channel; and
the first channel limits the range of the first signal emitter and the second channel limits the range of the second signal emitter such that the signals from the first signal emitter and the signals from the second signal emitter do not overlap.

19. The method of claim 13, wherein the recharging station comprises baffles for limiting the range of the signals and preventing signal reflections from creating false signals.

20. The method of claim 13, wherein:
receiving a same signal by the first signal receiver and the second signal receiver causes the mobile robot to execute predetermined navigational instructions; or
after driving a distance while receiving the first signal by the first signal receiver and the second signal by the second signal receiver one of the signal receivers no longer receives the corresponding signal causes the mobile robot to execute predetermined navigational instructions.

* * * * *